US 6,540,216 B2

(12) United States Patent
Tousi et al.

(10) Patent No.: US 6,540,216 B2
(45) Date of Patent: Apr. 1, 2003

(54) FOAMED ELASTOMER ENGINE MOUNT ISOLATING BUSHING

(75) Inventors: Shahram Tousi, Glenview, IL (US); Rod Hadi, South Lyon, MI (US)

(73) Assignee: Freudenberg-NOK General Partnership, Plymouth, MI (US)

(*) Notice: Subject to any disclaimer, the term of this patent is extended or adjusted under 35 U.S.C. 154(b) by 0 days.

(21) Appl. No.: 09/863,964

(22) Filed: May 23, 2001

(65) Prior Publication Data
US 2002/0175455 A1 Nov. 28, 2002

(51) Int. Cl.$^7$ .................. F16M 1/00; F16M 11/00; F16M 3/00; F16M 5/00; F16M 7/00
(52) U.S. Cl. .............. 267/140.3; 267/140.13; 267/293
(58) Field of Search .................. 267/292, 293, 267/136, 140, 140.11, 140.12, 140.13, 140.2, 140.3, 140.4, 141

(56) References Cited

U.S. PATENT DOCUMENTS

| 3,782,769 A | | 1/1974 | Fader et al. ............ 293/88 |
| 3,795,419 A | * | 3/1974 | Niemkiewicz et al. ...... 267/140 |
| 3,806,106 A | * | 4/1974 | Hamel et al. ............ 267/152 |
| 3,831,922 A | * | 8/1974 | Appleton ............... 267/140 |
| 3,884,455 A | | 5/1975 | Weller et al. ........... 267/140 |
| 3,939,106 A | | 2/1976 | Dunleavy et al. ....... 260/2.5 AM |
| 4,085,832 A | * | 4/1978 | Gaines et al. ........... 188/268 |
| 4,618,129 A | | 10/1986 | Bechu ................. 267/140.1 |
| 4,887,788 A | * | 12/1989 | Fischer et al. ......... 248/562 |
| 5,062,618 A | * | 11/1991 | Yamada et al. ......... 267/140.4 |
| 5,074,535 A | * | 12/1991 | Colford ............... 267/140.3 |
| 5,110,081 A | * | 5/1992 | Lang, Jr. ............. 248/635 |
| 5,156,380 A | * | 10/1992 | Cerruti et al. ......... 188/378 |
| 5,467,970 A | | 11/1995 | Ratu et al. ........... 267/220 |
| 5,489,087 A | * | 2/1996 | Bitschkus ............. 267/140.3 |
| 5,544,715 A | * | 8/1996 | Phillips .............. 180/417 |
| 5,665,785 A | | 9/1997 | McClellan et al. ...... 521/51 |
| 5,884,735 A | * | 3/1999 | Eckel et al. .......... 188/378 |
| 6,082,721 A | * | 7/2000 | Kingsley ............. 267/276 |
| 6,202,995 B1 | * | 3/2001 | Jou .................. 267/140 |
| 6,419,215 B1 | * | 7/2002 | Johnson et al. ........ 267/140.12 |

FOREIGN PATENT DOCUMENTS

| DE | 4244094 | * | 7/1993 | ............ 267/140.3 |
| JP | 403244841 | * | 10/1991 | ............ 267/140.3 |

* cited by examiner

Primary Examiner—Christopher P. Schwartz
Assistant Examiner—Devon Kramer
(74) Attorney, Agent, or Firm—Dinnin & Dunn, P.C.

(57) ABSTRACT

An engine mount bushing for use on a motor vehicle. The bushing includes a hard case, and a core located within that case. The bushing further includes an elastomer isolator contacting the core and case. The bushing also includes a foamed elastomer isolator contacting the core, the case and the elastomer isolator.

13 Claims, 2 Drawing Sheets

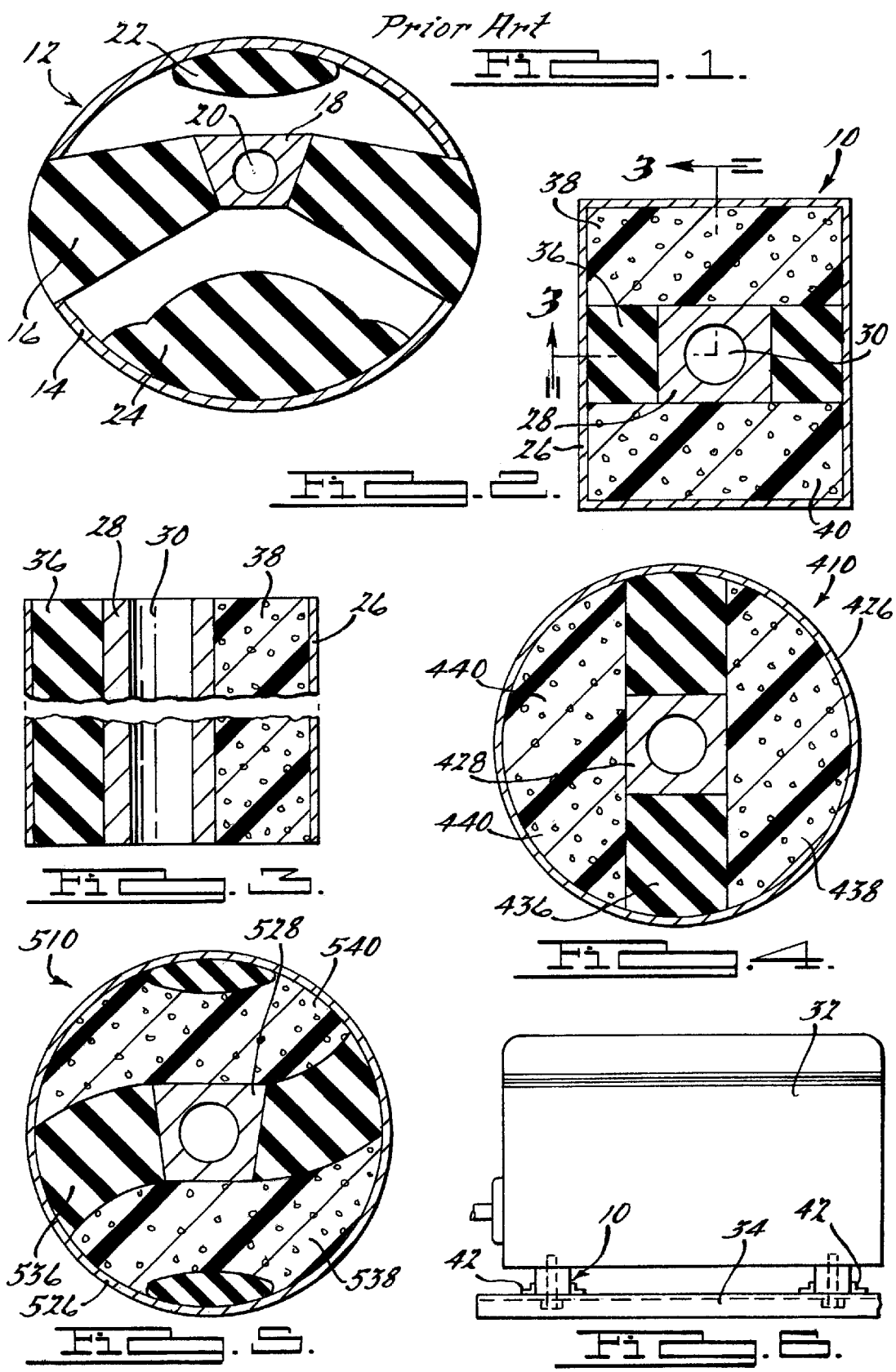

FOAMED ELASTOMER ENGINE MOUNT ISOLATING BUSHING

BACKGROUND OF THE INVENTION

1. Field of the Invention

The present invention relates to engine mounts for a motor vehicle, and more particularly relates to engine mount bushings used to isolate noise, vibration and harshness felt by a driver of a motor vehicle.

2. Description of the Related Art

In current day automotive vehicles the engine in the vehicle is connected to the frame or body of the vehicle via a vibration control component or unit. The vibration control component generally includes an engine mount bushing used in conjunction with a bracket system. The vibration control components will isolate any engine induced noise and vibration from being transmitted to the passenger compartment of the automotive vehicle. In a typical automotive vehicle the engine is connected to the body of the vehicle using three engine mount components, two load bearing components and one torque reaction component or mount. In more sophisticated vehicles the engine mounting system may utilize up to five engine mount components to improve the noise, vibration and harshness (NVH) performance. The mechanical behavior and characteristics of the bushing, along with the engine mounting brackets and its configuration, directly affects the noise, vibration and harshness felt by the driver through the steering wheel and seat rail. Prior art engine mount bushings generally use rubber as an isolating material. The rubber durometer plays a very important role in determining the isolation characteristics of the prior art bushings.

The vibration control component generally includes an engine mount component that is made from two parts, a rubber isolating bushing and a metal or composite material bracket. The rubber bushing is generally an integral part of the bracket and the two in combination create the isolating member. The engine mount is hard mounted to the sub-frame or body of the vehicle while the bushing core is attached to the engine. It should also be noted that in some instances the engine mount is hard mounted to the engine while the bushing core is attached to the sub-frame or body of the vehicle.

In operation, the conventional rubber bushing, i.e., two legged rubber bushing, is in compression during engine loading and is in tension when the engine is in reverse or rebound. The radius or outer shape of the bushing is determined by the required rates and allowable displacement of the bushing. The main load bearing direction of the bushing is very critical since the rate in this direction effects the noise, vibration and harshness performance considerably. Generally, in the conventional rubber bushings, the overall dimension and size of the rubber legs are the main design parameters along with the size of the ring. Rubber is the material of choice in the conventional bushings. Rubber is an incompressible material that will be displaced during loading which will require a large ring to accommodate the displaced value while maintaining the designed rates. Furthermore, the incompressible rubber material will resist any movement under loading conditions thus resulting in a drastic increase in rate behavior under pre-loaded conditions. The more the rubber element is compressed the higher its stiffness becomes. This rate buildup is almost instantaneous in this type of design. This becomes a very large drawback associated with the conventional rubber bushings since the effective rate varies considerably with the amount of engine pre-load. Therefore, there is a need in the art for an engine mount isolating bushing that provides a more consistent performance level over a wide range of engine loading and temperatures and does not have the large rate variations with the engine pre-load of prior art automotive vehicles.

SUMMARY OF THE INVENTION

One object of the present invention is to provide a new engine mount isolating bushing.

Another object of the present invention is to provide a foamed elastomer engine mount isolating bushing.

Yet a further object of the present invention is to provide a new bushing that provides for a much smaller package while maintaining a more consistent performance level over a wide range of engine loads and temperatures.

Still a further object of the present invention is to reduce the component weight while improving durability and noise, vibration and harshness performance issues.

Still a further object of the present invention is to provide a foamed elastomer and elastomer combination bushing.

To achieve the foregoing objects a bushing for use in an automotive vehicle is described. The bushing includes a hard case, and a core within the case. The bushing also includes an elastomer isolator member contacting the core and the case. The bushing further includes a foamed elastomer isolator contacting the core and the case.

One advantage of the present invention is that the new foamed elastomer bushing provides for a much smaller package than the conventional rubber bushings.

Still another advantage of the present invention is the improved consistency of the performance level over a wide range of engine loading and temperature variables.

Yet a further advantage of the present invention is the reduction in component weight while improving on durability and noise, vibration and harshness performance.

Another advantage of the present invention is the reduction in size of the bushing and brackets necessary to connect the bushing to the vehicle body frame and engine.

Yet another advantage of the present invention is the foamed elastomer being pre-compressed which provides for a good isolation from vertical load rate shifts.

Other objects, features, and advantages of the present invention will become apparent from the subsequent description and appended claims, taken in conjunction with the accompanying drawings.

BRIEF DESCRIPTION OF THE DRAWINGS

FIG. 1 shows a prior art rubber bushing.

FIG. 2 shows a top view of the engine mount bushing according to the present invention.

FIG. 3 shows a cross section of the engine mount bushing according to the present invention.

FIG. 4 shows a top view of an alternate embodiment of an engine mount bushing.

FIG. 5 shows an alternate embodiment of an engine mount bushing.

FIG. 6 shows a n engine mount bushing in relation to the engine and a body or frame of the vehicle.

DESCRIPTION OF THE PREFERRED EMBODIMENT(S)

Figure 7:
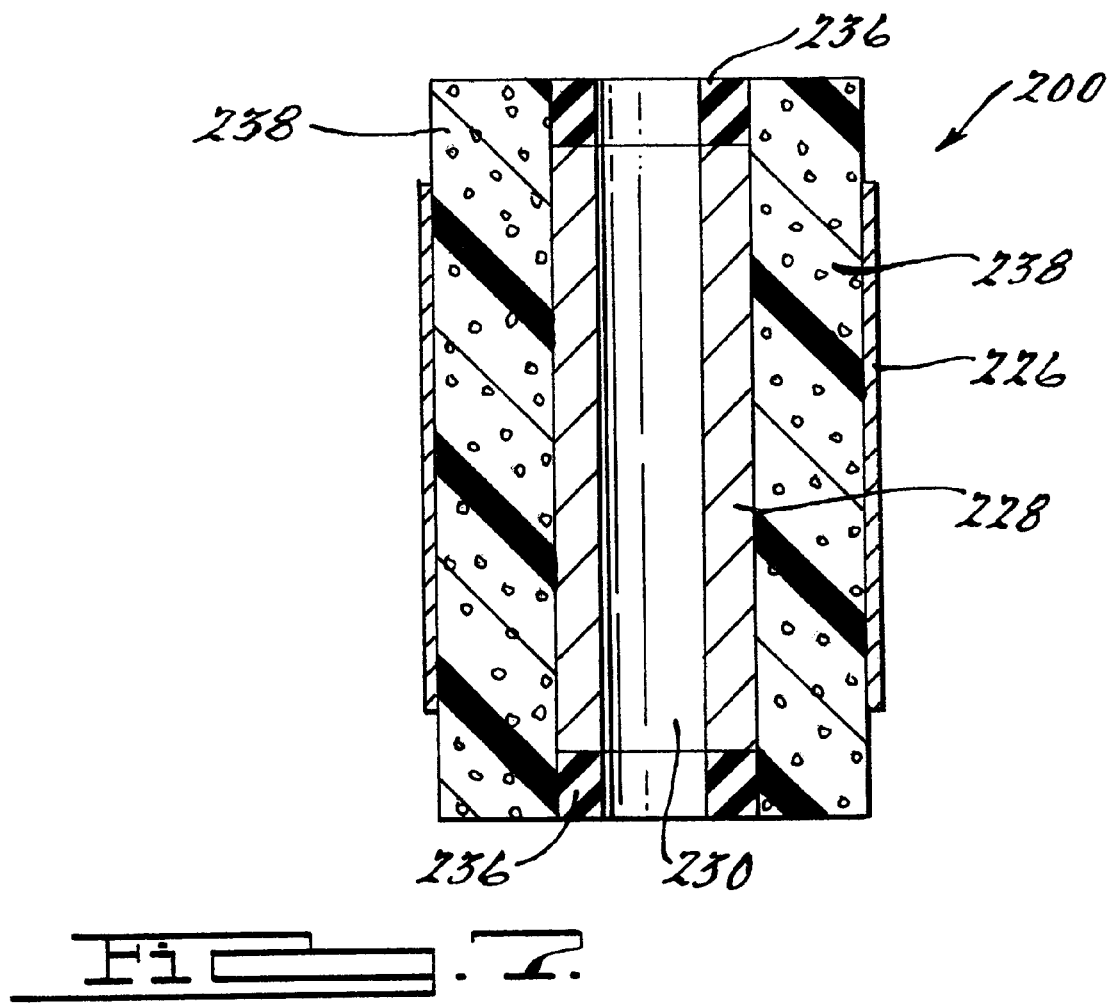
FIG. 7 shows an alternate embodiment of an engine mount bushing.

Referring to the drawings, a foamed elastomer engine mount bushing 10 according to the present invention is shown.

FIG. 1 shows a prior art device that is a two-legged or conventional rubber bushing currently used in a majority of motor vehicles. The prior art bushing 12 includes a circular metal outer case 14 surrounding a two-legged rubber isolator member 16. The rubber isolator member 16 is bonded to a metal core 18 that includes an aperture 20 for connection either to the engine or body frame. The conventional rubber bushing 12 also include first and second secondary isolator members (22, 24) located against the inside surface of the case 14 but not in contact with the main two legs of the rubber isolator member 16. The prior art bushings 12 main drawback is that the effective rate of its isolation characteristics vary considerably with the amount of engine pre-load. Therefore, if the prior art conventional bushing 12 is designed to handle the normal engine pre-load it will not be able to isolate the noise, vibration, and harshness during operation of the engine and motor vehicle.

FIGS. 2 and 3 show the foamed elastomer engine mount bushing 10 according to the present invention. The foamed elastomer engine mount bushing 10 includes a hard outer case 26. In the preferred embodiment the case 26 is metal but it should also be noted that any other composite or hard material may be used for the case of the bushing 10. The case 26 can have an outer dimension relating to any shape such as rectangular, square, circular, triangular or any other shape of surface depending on the size and weight requirements needed for the vehicle using the bushings. The preferred embodiment of the foamed elastomer engine mount bushing 10 uses a rectangular shape for the outer case 26. Within the case 26 of the bushing 10 is a center core 28 that is located at or near a center point of the bushing 10 when viewed from a top view. The center core 28 is preferably made of a metal material but may also be made of any hard composite material. The center core 28 includes an aperture 30 along the entire length thereof The aperture 30 is used to connect the center core 28 of the bushing to either the engine 32 or body frame 34 depending on the requirements of the automotive manufacturer.

The bushing 10 also includes an elastomer isolator center piece 36 located within the metal case 26 and is in contact with the inner walls of the metal case 26 and the center core 28. The elastomer isolator 36 in our preferred embodiment is made of rubber but it should also be noted that any other elastomer material may be used depending on the needs and characteristics of the engine mount and its environment. The elastomer isolator 36 is positioned such that it has a predetermined stiffness rate in a specific direction. As shown in FIG. 2, the elastomer isolator 36 is connected in a lateral direction across the width of the metal case 26. The elastomer isolator member 36 is bonded to the metal case 26 and the center core 28. In the preferred embodiment it is molded to both the metal case 26 and the center core 28 but any other type of bonding may be used. The elastomer isolator member 36 is also used to hold the center core 28 securely in place thus helping position the engine mount 10 with relation to the engine 32 and body frame 34. A first foamed elastomer isolator member 38 and a second foamed elastomer isolator member 40 are located on either side of the elastomer isolator member 36 and the center core 28. The first and second foamed elastomer isolators 38, 40 sandwich the elastomer isolator 36 and center core 28 within the metal case 26 of the bushing. The foamed elastomer isolator members 38, 40 are preferably a micro-cellular polyurethane material, but it should be noted that any other type of foamed elastomer or other type of similar material may be used depending on the characteristics needed for the engine mount bushing 10. The foamed elastomer isolator members 38, 40 are connected to the metal case 26 and elastomer isolator 36 by an adhesive, but it should be noted that any other type of connection between the foamed elastomer isolators 38, 40 and elastomer isolator 36 and metal case 26 may also be used.

The vertical absorption rate for the engine mount bushing 10 is dominated by the foamed elastomer rate, while the elastomer isolator 36 dominates the lateral rate and fore/aft rate of absorption by the engine mount bushing 10. A soft vertical rate is directly related to the first and second foamed elastomer isolators 38, 40 in the vertical direction along with its density. The height and cross sectional area of each foamed elastomer isolator 38, 40 determines the vertical absorption rate in conjunction with its density. In the preferred embodiment the density of the foamed elastomer isolators 38, 40 typically varies from 0.3 to 0.7 grams per cubic centimeter. However, it should be noted that any other range from 0.001 grams to 10 grams per cubic centimeter may also be used depending on the desired characteristics. The micro-cellular polyurethane cells will collapse on top of each other under compression loading, thus providing for a low vertical stiffness and hence improved ride characteristics of the vehicle.

The foamed elastomer isolators 38, 40 while being adhesively bonded to the elastomer isolator 36 is not bonded to the center core 28 and therefore does not see any tension loading only compression loading which creates better characteristic rate handling of any compression or vertical loads on the bushing. Furthermore, the foamed elastomer isolators 38, 40 are in precompression which creates good isolation characteristics for the engine mount bushing 10. The precompression will keep the static and dynamic rates of absorption of the engine mount 10 in a linear and soft region thus improving isolation of vibration, noise and harshness from the engine 32 to the body frame 34 and on through to the passenger compartment. If the foamed elastomer isolators 38, 40 were not precompressed, upon loading the isolation rate would be very high and then upon further loading the rate would be reduced, therefore the rate would not be linear and would pass all vibration and noise through the engine mount 10 to the body frame 34.

The elastomer isolator 36 will provide for high lateral absorption rate which is needed in the mount bushing for tension loads. The elastomer isolator 36 will also provide a connection and attachment under fore and aft loading which is not possible with the foamed elastomer isolators 38, 40 due to the low shear strength and fatigue performance under shear or tension load of the foamed elastomer material.

FIG. 4 and FIG. 5 show alternate embodiments of the combination foamed elastomer and elastomer mount bushing 410, 510 including a circular outer metal case (426, 526), a center core 428, 528, and a combination of elastomer isolator members 436, 536 sandwiched around the foamed elastomer isolators 438, 538, 440, 540 in various designs. Each of the designs is dependent on specific characteristics needed to isolate the vibration from the engine 32 to the body or sub-frames 31.

It should be noted that when designing an engine mounting system it is very critical that the power train is positioned accurately and firmly with respect to the rest of the vehicle body at idle and at partial throttle. While at idle and partial throttle it also is incumbent upon the designer to remove any engine noise and vibration from the passengers, i.e., to set up a shield for the passenger compartment from the engine. Therefore, a proper design of the engine mounting system will require that a specific rate has to be achieved and maintained at each mounting position for the idle and partial throttle requirements in a simultaneous manner. These rates have to be maintained under all engine loading conditions or the engine mount system risks passing vibrations on to the passenger compartment. The use of the all rubber conventional bushing has the drawback that the rubber material is incompressible. Therefore, in the new foamed elastomer engine mount bushing 10 the foamed elastomer material is a high compressible structure due to its inherent micro-cellular structure. The foamed elastomer is generally made such that its micro-cellular structure represents cell units filled with air. This is done by blowing air into an elastomer material. However, once the foamed elastomer material is compressed the cell structure tends to collapse on its own to push the air out. This behavior of foamed elastomer makes it an excellent vibration isolation material under sudden impact loads which is extremely desirable for noise, vibration and harshness performance. The foamed elastomer material also exhibits behaviors that result in a more gradual absorption of load while providing a broader range of linear behavior. Furthermore, the foamed elastomer, with its micro-cellular structure, has a dynamic rate that does not vary drastically with the amount of pre-load, which is a very desirable characteristic for an engine mount bushing. However, it must be mentioned that the foamed elastomer does exhibit a very low shear modulus and low fatigue performance under tension loading. Therefore, it is critical that the foamed elastomer isolator always be under a compression load so as to take advantage of its positive characteristics as discussed above. Therefore, an elastomer used in conjunction with a foamed elastomer will provide stiffness in the other two directions, i.e., lateral and fore/aft direction with relation to the vertical direction of the foamed elastomer. This will ensure that the fatigue performance, where the foamed elastomer is very low, will be protected by the elastomer material. This new combined elastomer and foamed elastomer power train bushing will not only provide superior noise, vibration and harshness performance, but it will provide for critically important high absorption rates to maintain proper positioning of the power train.

As shown in FIG. 6 the engine mounts 10 include a bracket member 42 which is an integral part of the metal case 26 of the engine mount bushing 10. The bracket 42 is used to connect to the frame 34 of the motor vehicle while the engine 32 is connected via the aperture 30 in the center core 28 and a fastener 44. The fastener 44 will directly connect into the engine 32 thus connecting the engine 32 to the center core 28. It should be noted that in other applications the center core 28 may be connected to the frame or body 34 while the bracket of the engine mount bushing 10 is connected to the engine 32. When using the combination elastomer and foamed elastomer bushing 10 the overall size of the bushing 10 is greatly reduced, typically to a 50% smaller size than that compared to the typical conventional bushing. Furthermore, the mating bracket or links will consequently be smaller in size due to the smaller bushing size required. It should also be noted that the overall bushing and mating bracket and/or link will weigh less typically 30 to 70% lower than common conventional bushings with mating bracket and link. The reduced weight and size is attributed to the combination of the elastomer and foamed elastomer each predominately reducing noise and vibration from being transmitted in a particular direction to the passenger compartment. In the case of the foamed elastomer isolators 38, 40 it reduces noise and vibration being passed through on all compression or vertical loads on the bushing while the elastomer isolator 36 will reduce any noise, vibration and harshness passed through to the passenger compartment on any lateral or fore/aft loads such as those found in tension loading in the automotive vehicle.

It should be noted that any number of vehicle dynamics can be designed by changing the stiffness of the elastomer isolator 36 and the density and dimension of the foamed elastomer isolators 38, 40. Therefore, any range of vehicle riding characteristics can be achieved based on changing the design parameters of the bushing. Also the location of the rubber isolator member and the foamed elastomer isolators within the bushing case also determine which lateral and fore aft loads will be isolated the best and the amount of vertical load isolation present. The smaller the foamed elastomer isolator 38, 40 within the bushing the lower the vertical isolation rate will be but the larger the elastomer isolator member 36 the greater the lateral and fore/aft isolation rates will be.

FIG. 7 shows a second alternate embodiment of the present invention. The foamed elastomer engine mount bushing 200 includes a hard outer case 226. The hard outer case 226 is preferably metal but any other hard material may also be used. A center core 228 is located at or near the center of the outer case 226. The center core 228 includes an aperture 230 along an entire length thereof The aperture 230 connects the center core 228 to either the engine or body frame depending on the vehicle. The bushing 200 also includes an elastomer isolator 236. The elastomer isolator extends above both ends of the center core 228 and the ends of the outer case 226. The bushing 200 also includes a foamed elastomer isolator 238 that extends beyond the ends of the outer case 226. The foamed elastomer isolator 238 is even with the elastomer isolator 236. The alternate embodiment bushing 200 connects to the engine and body frame and will isolate NVH concerns as described above for the preferred embodiment.

The present invention has been described in an illustrative manner, it is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A bushing, said bushing including:
   a hard case;
   a core within said case;
   an elastomer isolator contacting said core and said case; and
   a foamed elastomer isolator contacting said core and said case along an entire axial length thereof.

2. The bushing of claim 1 wherein said elastomer isolator is a rubber material.

3. The bushing of claim 1 wherein said foamed elastomer isolator is a micro-cellular polyurethane material.

4. A bushing of claim 1 wherein said elastomer isolator is bonded to said core and said case.

5. The bushing of claim 4 wherein said foamed elastomer isolator is bonded to said case.

6. The bushing of claim 1 wherein said foamed elastomer isolator is pre-compressed.

7. The bushing of claim 1 wherein said elastomer isolator holds said core in position within said case.

8. The bushing of claim 1 wherein said elastomer isolator provides the bushing with high lateral loading case.

9. The bushing of claim 1 wherein said elastomer isolator creates an attachment for said bushing under lateral loading.

10. The bushing of claim 1 wherein an adhesive bonds said elastomer isolator to said foamed elastomer isolator.

11. The bushing of claim 3 wherein a density of said foamed elastomer isolator is approximately 0.3 to 0.7 grams/cc.

12. The bushing of claim 1 wherein said foamed elastomer isolator creates a low vertical stiffness for said bushing.

13. An engine mount isolating bushing for use on a vehicle between an engine and frame of the vehicle, said bushing including:

a metal case;

a metal center core located near a center point of said case, said center core having an aperture therethrough;

a rubber isolator centerpiece bonded to said center core and said case; and a first micro-cellular polyurethane isolator and a second micro-cellular polyurethane isolator, said rubber isolator is located between said first micro-cellular polyurethane isolator and said second micro-cellular polyurethane isolator, said first and second micro-cellular polyurethane isolators predominately determine a vertical absorption rate of loads, said rubber isolator predominantly determines a lateral absorption rate of loads.

* * * * *